United States Patent
Kamleiter et al.

(10) Patent No.: US 8,393,477 B2
(45) Date of Patent: Mar. 12, 2013

(54) FILTER MEDIUM

(75) Inventors: Michael Kamleiter, Stuttgart (DE); Wilhelm N. Gudernatsch, Stuttgart (DE); Edith Gudernatsch, legal representative, Stuttgart (DE)

(73) Assignee: X-Flow B.V., Enschede (NL)

( * ) Notice: Subject to any disclaimer, the term of this patent is extended or adjusted under 35 U.S.C. 154(b) by 1713 days.

(21) Appl. No.: 11/632,631

(22) PCT Filed: Sep. 15, 2004
(Under 37 CFR 1.47)

(86) PCT No.: PCT/EP2004/010304
§ 371 (c)(1),
(2), (4) Date: Nov. 28, 2007

(87) PCT Pub. No.: WO2005/032699
PCT Pub. Date: Apr. 14, 2005

(65) Prior Publication Data
US 2008/0257817 A1  Oct. 23, 2008

(30) Foreign Application Priority Data
Sep. 19, 2003 (DE) .................. 103 43 456

(51) Int. Cl.
*B01D 69/10* (2006.01)
(52) U.S. Cl. .................. 210/489
(58) Field of Classification Search .......... 210/490, 210/489
See application file for complete search history.

(56) References Cited

U.S. PATENT DOCUMENTS

| 3,659,718 A * | 5/1972 | Brociner et al. ......... 210/333.01 |
| 4,072,793 A | 2/1978 | Watanabe et al. |
| 4,913,817 A | 4/1990 | Tsushima et al. |
| 4,954,388 A | 9/1990 | Mallouk et al. |
| 5,254,251 A * | 10/1993 | Bengtson et al. ........... 210/490 |

FOREIGN PATENT DOCUMENTS

| DE | 41 42 417 | 6/1992 |
| EP | 0 355 400 | 7/1989 |
| EP | 0 761 292 | 3/1997 |
| JP | 04 326929 | 11/1992 |
| WO | WO 99/61130 | 12/1999 |

* cited by examiner

*Primary Examiner* — Bobby Ramdhanie
*Assistant Examiner* — Denise R Anderson
(74) *Attorney, Agent, or Firm* — Roylance, Abrams, Berdo & Goodman L.L.P.

(57) ABSTRACT

A filter medium includes at least one filter membrane (10) having a fabric ply (12) as a supporting and protective layer. At least one additional filter membrane (14) with another fabric ply (16) as a supporting and protective layer is also provided. A third fabric ply (18) extends between both adjacent filter membranes (10, 14). Both adjacent filter membranes (10, 14) are connected together by the threads (26) of the other two plies (12, 16) which reach through to the third ply (18).

9 Claims, 1 Drawing Sheet

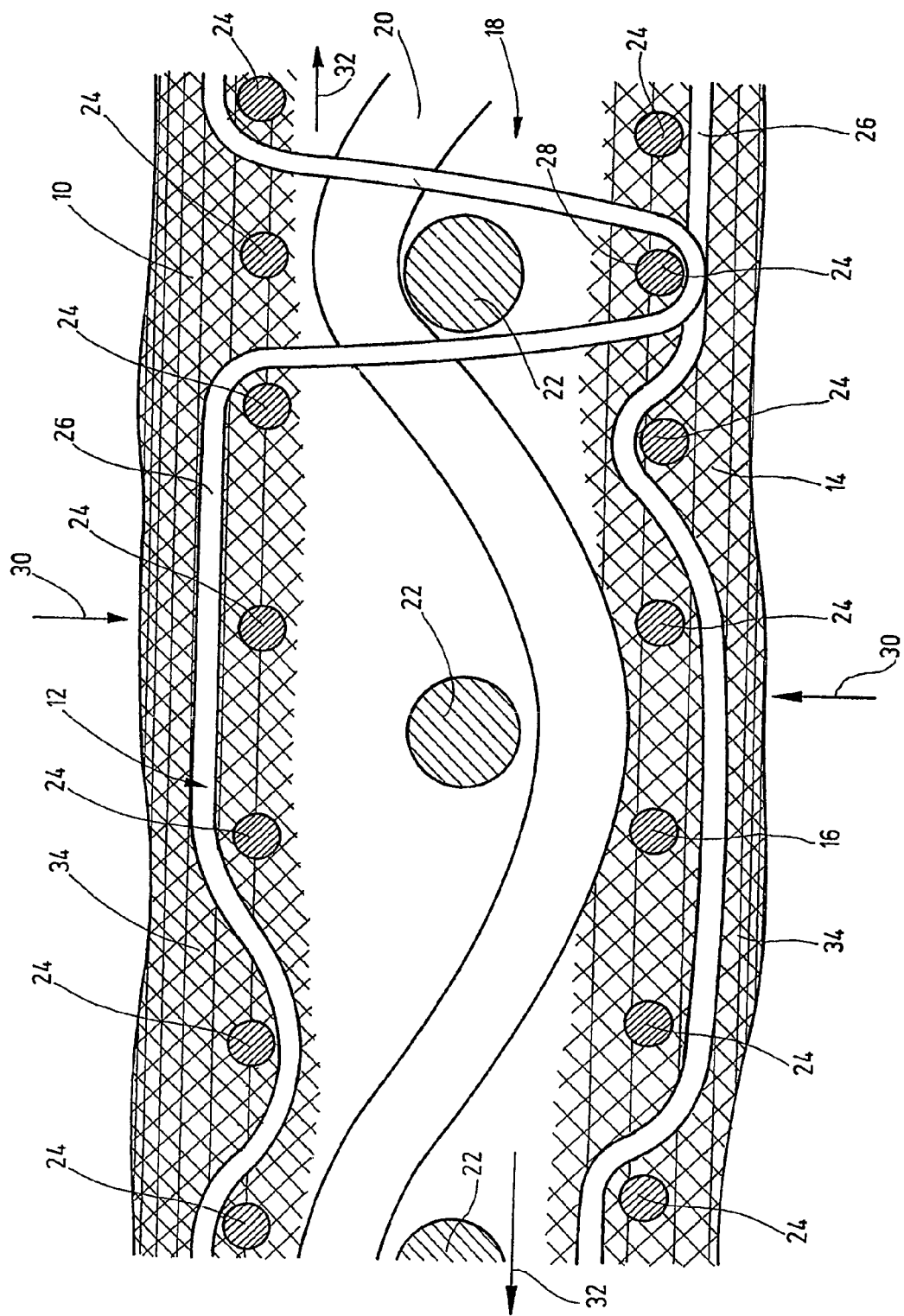

FILTER MEDIUM

FIELD OF THE INVENTION

The present invention relates to a filter medium with at least one filter membrane having a fabric ply as the support and protective layer.

BACKGROUND OF THE INVENTION

EP 0 761 292 A1 discloses self-supporting capillary membranes for use at higher pressure with an internal separating layer. This known capillary membrane is provided with a seamless outside jacket made as a closed, liquid-permeable diagonal reinforcement. The diagonal reinforcement has individual threads including for their part either of monofilaments or multifilaments. The material selection for these monofilaments or multifilaments is almost unlimited. For example, polyester yarns, polyaramides, polymer fibers, glass fibers, or metal filaments are used. The individual threads of the diagonal reinforcement are applied to the capillaries in a 1:1 to 2:1 or even 2:2 braid binding in a continuous process as a seamless outer jacket. Depending on the wall thickness of the monofilaments or multifilaments, capillaries with outside diameters from 0.5 mm to 15 mm are produced. The capillaries themselves must have a mechanical stability that resists the thread tension in the reinforcing process. This known capillary membrane can be continuously produced. Due to the indicated diagonal reinforcement, it has a correspondingly high burst pressure; but the performance in filtration is limited. In spite of support by the liquid-permeable diagonal reinforcement, in severe filtration operation the membrane material surrounded in this way can fail.

DE 41 42 417 A1 discloses an ion exchanger membrane which, in order to eliminate these disadvantages, calls for reinforcement with a multiaxial, preferably triaxial, yarn system. In a chlor-alkali cell, using an open reinforcing fabric and a thin membrane to obtain low cell tension and good stability for handling of the reinforcing fabric and for the reinforced membrane is considered to be advantageous. A thin membrane in turn requires a thin fabric and low total thickness of the film layers used for lamination of the reinforced cation exchanger resin. By definition, an open fabric is one which, when there is illumination from one direction perpendicular to the plane of the fabric, enables a large portion of the incident light to pass through the fabric. This fabric with a high percentage of open points (fabric gaps) is desirable according to the known solution, because the open sites allow the cations to pass from the anolyte to the catholyte in a chlor-alkali process. An open fabric then enables a low cell tension, and therefore, lower power consumption. The known fabrics in the form of a basket weave or a cross weave are regarded as disadvantageous because they lack dimensional stability and have a low modulus and low strength in the oblique direction of the fabric laminate. Accordingly, the known solution proposes a triaxially woven article, that is, a fabric produced by a weaving process, in which three yarns at an angle of 60° each to one another are used. In particular, if the triaxial fabric is produced from fine yarns, a thin fabric can be obtained that is stable under various loads, even if the fabric has the desired high degree of open sites. The disadvantage in this known solution is that the indicated multiaxial fabric is relatively complex and expensive to produce, making the membrane material more expensive. Furthermore, this solution is limited in filtration performance by its basic structure of the membrane material.

EP 0 355 400 A2 discloses a filter medium for caking filtration processes with a filter membrane embedded on either side in a fabric construction assuming a mechanical protective function. With this known filter medium, within filter systems in which the filter medium is mechanically loaded to an extremely heavy degree, suspensions can be processed and particles in the submicroporous range filtered out of the fluid flow. In one preferred embodiment of the known solution the membrane mass can be located between two fabric plies. The membrane mass is applied to a compact, strong carrier fabric ply. A protective fabric ply is embedded into the upper layer of the membrane mass. This protective fabric ply is made as an open-mesh fabric, achieving a sandwich structure for the filter medium for caking filtration processes. This generic filter-medium has risen to the robust mechanical requirements conventionally imposed by filtration technology. Especially when the filter cake is removed or discarded, the filter medium is exposed to considerable mechanical loads which can be managed with the known filter medium. Still, the filtration performance is not satisfactory even in this durable solution.

SUMMARY OF THE INVENTION

An object of the present invention is to provide an improved filter medium ensuring high filtration performance with a durable solution for an economical production capacity.

This object is basically achieved by a filter medium where at least one other filter membrane with another fabric ply is present as the support and protective layer. Between the two adjacent filter membranes, a third fabric ply extends. The two adjacent filter membranes are connected to one another via threads of the two other fabric plies which extend through the third fabric ply. A double-sided filter structure is formed. On either side one or more fine fabric layers in the form of the other two fabric plies are applied non-positively to the simultaneously supporting and draining central fabric as the third fabric ply. The two outer fabric layers then each bear a non-positively connected membrane making contact with the medium to be filtered on its outside. Accordingly it is possible to supply the medium to be filtered from both sides, that is, from the top and bottom of the double membrane to the latter. This arrangement leads to a distinct increase of the filtration performance, and at the same time strong lamination for the double membrane is obtained so that it is also suited for hard use in filtration systems and has a long service life.

The driving force for filtration can be obtained both by filtrate-side negative pressure and by medium-side overpressure or by a combination of the two. The medium-side cross-flow can be achieved by filter-parallel convective flow or by air bubbles or by both. The double-sided filter structure of the present invention is especially well suited for flushing processes in which the driving force is reversed. Furthermore, it is easily possible to apply cleaning chemicals to the filter during backflushing.

The double-sided filter structure of the present invention is preferably produced continuously. The longitudinal edges are sealed during production. Besides direct encapsulation, techniques such as welding, cementing, beading, knurling, etc., can be used. After completed cutting, the front sides can also be sealed with those techniques or can be cast into transverse tubes by which the filtrate can be withdrawn.

The double-sided filter structure can be used in the most varied geometries. It can be immersed especially as flat vanes into the medium to be filtered. Multiple-ply stacked or helical rolling and placement in tubes (stack) are likewise possible.

The present invention need not be limited to a double membrane. With interposition of other fabric plies, a multilayer membrane can be obtained comparably to the third fabric ply in a configuration on top of one another. This fabric ply laminate also ensures that the individual fabric plies are held against one another even under high stress.

In one preferred embodiment of the filter medium of the present invention, the respective fabric ply has warp and weft threads. The fabric plies are joined via additional binding threads changing at least one binding point from the fabric ply of one filter membrane into the adjacent fabric ply of the other filter membrane or from one of the two outer fabric plies into the adjacently arranged third fabric ply. Via the additional binding thread system, without disrupting the actual fabric structure, a reliable combination for the filter medium can be achieved. At the same time, the fabric plies of the filter membranes are provided with a high percentage of open passage sites so that a fluid flow can enter the filter structure having open pores without hindrance. By preference, the fabric ply of the respective filter membrane has weft threads as a cross thread system, and the longitudinal thread system is made up solely of binding threads as warp threads.

In another embodiment of the filter medium of the present invention, the fabric ply of the respective filter membrane is made up of warp and weft threads. The weft threads produce the connection of the adjacent filter membranes as they extend through the other fabric ply. In this configuration a very reliable, highly loadable laminate of fabric plies with one another is achieved. This structure burdens the open structures of the filter membranes with the fabric plies assigned to it.

In another, especially preferred embodiment of the filter medium of the present invention, the warp and weft threads of the third fabric ply are dimensioned thicker in diameter than the threads of the two adjacent fabric plies used with the filter membranes. Based on this configuration, the middle third fabric ply can be coarse as a support and drainage fabric. In this way, filtrate discharge for the filter medium is largely ensured. Conversely, the filter membranes have the structure of a fine fabric layer with an open-pore structure.

In another preferred embodiment of the filter medium of the present invention, the threads used are formed from a polyester or a polyamide material. For the capillary membrane material, a polymer material is used, preferably in the form of polyether sulfone (PES), polysulfone (PSU), polyacrylonitrile (PAN), polyvinylidene fluoride (PVDF). Preferably, the polymer material is polysulfone obtained in solutions by extrusion and setting by contact with water.

In another preferred embodiment, the filter medium of the present invention is made as a flat filter material. The longitudinal tensile stresses occurring during filtration are accommodated by the longitudinal fibers extending through. The stresses on the periphery are reliably accommodated by the transversely extending threads of the fabric ply laminate. This structure reduces the shifting of the threads against one another so that unwanted stretching effects during coating of the membrane material are distinctly minimized. The filtration capillary fabric-reinforced in this way resists very high internal pressure and longitudinal tensions. As the thread thickness, threads with a diameter from 20 to 200 microns can be used, and the number of threads is 3 to 6. The selected angle of the transverse threads is preferably between 45° to 90°, with the inside diameter 1 mm to 20 mm.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure:

FIG. 1 is a partial side elevational view in section of a filter medium according to an exemplary embodiment of the present invention and illustrated schematically and not to scale.

DETAILED DESCRIPTION OF THE INVENTION

The filter medium, according to an exemplary embodiment of the present invention, has an upper filter membrane 10 with a fabric ply 12 as the support and protective layer. The filter medium has another lower filter membrane 14 with another fabric ply 16 as the support and protective layer. A third fabric ply 18 extends between the two adjacent filter membranes 10, 14. This third fabric ply 18 has a thread system of warp threads 20 and weft threads 22. The warp threads 20 form the longitudinal fiber system, and the weft threads form the transverse thread system of the third fabric ply 18. These longitudinal and transverse threads can be interchanged such that the warp threads 20 form the weft thread system and the weft threads 22 form the warp thread system. The upper fabric ply 12 and the lower fabric ply 16 are likewise composed of a longitudinal and a transverse thread system with individual warp threads (not shown) and weft threads 24. As the FIGURE shows, by threads 26 made as binding threads, the two fabric plies 12, 16 are connected to one another. The pertinent threads 26 extend through the third fabric ply 18. If the fabric ply 14 has additional binding threads 26, they change at least one binding site 28 from the fabric ply of one filter membrane 10 into the adjacent fabric ply 16 of the other filter membrane 14. The binding site 28 is formed by the binding thread 26 of the upper fabric ply 12 leaving the upper fabric, viewed in the direction of the FIGURE. In the process, binding thread 26 extends under the weft thread 22 (cross thread) of the third fabric ply 18 at the point at which the warp thread 20 (longitudinal thread) extends over the weft thread 22 assigned to it. At the indicated binding site 28, the weft thread 24 of the upper filter membrane 10 is kept free of the changing lamination, with the assigned binding thread 26 extending under the underlying weft thread 24 of the lower filter membrane 14. Otherwise, the weft threads 24 of the two filter membranes 10, 14 form one thread-bearing bridge at a time for the binding threads 26 which in this respect extend over or under three weft threads 24 before being changed in the direction of the binding site 28 or the following weft thread 24 of the upper fabric ply 12 or the lower one being passed under or over, respectively.

In another alternative embodiment (not shown), it can also be possible to replace the longitudinal threads (not shown) in the upper and lower fabric ply lamination 12, 16 solely by the binding threads 26. This alternative does reduce the strength of the lamination. Otherwise, it leads to an open-pore fabric structure for the respective filter membrane 10, 14. It would also optionally be possible to form only one of the filter membranes 10 or 14 in this way. Furthermore, in an embodiment of the filter medium of the present invention (not shown), it is also possible to omit the binding threads 26 and to produce the lamination by the longitudinal threads of the respectively upper and lower fabric ply 12 and 16 which then change crosswise through the third fabric ply 18.

The warp threads 20 and the weft threads 22 of the third fabric ply 18 are dimensioned thicker in diameter than the thread systems of the two adjacent fabric plies 12, 16 used with the filter membranes 10, 14. This structure yields a very stiffly made support and drainage fabric for the third fabric ply 18. At the same time, the filtrate can be discharged by the relatively open structure with a channel cross section dimensioned to be large in diameter on either side of the double membrane above and below of the longitudinal thread system 20, if, according to the partial representation as shown in the FIGURE, the medium to be filtered at the time enters the double membrane structure on either side from the top and from the bottom. The parts of the flow of medium are shown with arrows 30 and those of the filtrate flow are shown with arrows 32.

The threads used for the individual fabric plies 12, 16, 18 are preferably of a polyester or polyamide material and are within the membrane material. The membrane material 34 itself is of a polymer material, preferably of polysulfone (PSU) formed in solution by extrusion and setting by contact with water.

The filter medium of the present invention can be made as a flat filter material and as tubular material. For this purpose, longitudinal tensile stresses can be reliably accommodated by the longitudinal threads extending through. Stresses on the periphery are reliably accommodated by the transversely running threads (weft threads 24). The respective looping reduces the displacement of the thread systems against one another. The unwanted stretching effect during coating is minimized. The filtration capillary is fabric-reinforced in this way resisting very high internal pressures and longitudinal tensions. Various exemplary embodiments of the carrier-supported tubular membrane, when using polysulfone for the membrane material, have resulted in porous tubes with a diameter of 8 mm inside and 10 mm outside, having tensile strengths of 3 to 4 $N/mm^2$ at a breaking elongation of 20%. In a dynamic pressure test, these tubes have withstood a burst pressure of a maximum 1.5 bar.

If the same solution is produced together with diagonally braided hoses homogeneously extruded with the same dimensions of 8 mm inside and 10 mm outside, tensile strengths of 20 $N/mm^2$ at a breaking elongation of 50% arise. In the dynamic pressure test, these tubes withstood a burst pressure of 10 bar. Shortening of the tube by approximately 10% is observed. The pertinent shortening force leads to strong loading of the retaining device of the tubes, which in the extreme case yield tensile forces up to 500 kg. This loading leads to deformations and to tearing out of the parts of the retaining device.

If the same solution with hoses braided twice diagonally is homogeneously extruded with the same dimensions, the tensile strength is 50 $N/mm^2$ at a breaking elongation of 20%. In the dynamic pressure test, these tubes withstood a burst pressure of 10 to 15 bar, but in turn a shortening of the pipe of 5% being observed.

The warp threads, the weft threads and the binding threads can be made of different polymers to be able to optimize the mechanical strength and the chemical resistance to the application independently of one another. In this connection, especially chemically inert polypropylene materials or very stable polyetherether ketone materials are possible.

While one embodiment has been chosen to illustrate the invention, it will be understood by those skilled in the art that various changes and modifications can be made therein without departing from the scope of the invention as defined in the appended claims.

What is claimed is:

1. A filter medium, comprising:
   at least one first filter membrane having a supportive and protective first fabric ply made up of warp and weft threads;
   at least one second filter membrane having a supportive and protective second fabric ply made up of warp and weft threads; and
   a third fabric ply extending between and adjacent to said first and second filter membranes, said weft threads of one of said first and second fabric plies extending through said third fabric ply to connect said first and second filter membranes.

2. A filter medium according to claim 1 wherein
   said third fabric ply is made up of warp and weft threads; and
   additional binding threads join said fabric plies changing at least one binding point from said fabric ply of one of said filter membranes to said fabric ply of the other of said filter membranes.

3. A filter medium according to claim 1 wherein
   said weft threads of said first fabric ply and said second fabric ply form cross thread systems; and
   a longitudinal thread system of at least said first fabric ply is made up solely of binding threads as said warp threads thereof.

4. A filter medium according to claim 1 wherein
   said third fabric ply is made up of warp and weft threads thicker in diameter than said warp and weft threads of said first and second fabric plies.

5. A filter medium according to claim 1 wherein
   said threads are formed of a polyester or polyamide material; and
   said first and second membranes are formed of a polymer material.

6. A filter medium according to claim 1 wherein
   said first and second membranes and said third fabric ply form a flat filter material.

7. A filter medium according to claim 1 wherein
   said first and second membranes and said third fabric ply form a tubular filter material.

8. A filter medium according to claim 1 wherein
   one of said weft threads of said first fabric ply extends from said first fabric ply, through said third fabric ply, about one of said warp threads of said second fabric ply and back into said first fabric ply.

9. A filter medium according to claim 1 wherein
   said first and second fabric plies are located within said first and second membranes, respectively.

* * * * *